(12) United States Patent
Chandler (10) Patent No.: US 12,044,171 B1
(45) Date of Patent: Jul. 23, 2024

(54) ENGINE WITH INTERCOOLER (71) Applicant: Raytheon Technologies Corporation, Farmington, CT (US)

(72) Inventor: Jesse M. Chandler, S. Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/108,532

(22) Filed: Feb. 10, 2023

(51) Int. Cl.
*F02C 7/18* (2006.01)

(52) U.S. Cl.
CPC .......... *F02C 7/18* (2013.01); *F05D 2260/213* (2013.01)

(58) Field of Classification Search
CPC .. F02C 6/08; F02C 7/143; F02C 7/141; F02C 7/224; F02C 7/32; F02C 3/10; F02C 3/04; B64D 27/14
See application file for complete search history.

(56) References Cited

U.S. PATENT DOCUMENTS

| | | | |
|---|---|---|---|
| 5,581,997 A * | 12/1996 | Janes | F01D 1/023 60/39.12 |
| 6,948,558 B2 * | 9/2005 | Maisotsenko | F28F 9/26 165/110 |
| 10,126,062 B2 | 11/2018 | Cerny et al. | |
| 11,124,305 B2 * | 9/2021 | Venter | B64D 27/18 |
| 2009/0313999 A1 * | 12/2009 | Hunter | F02C 7/18 60/730 |
| 2021/0247152 A1 * | 8/2021 | Roberge | F28D 7/1638 |
| 2022/0034592 A1 | 2/2022 | Maynard et al. | |

FOREIGN PATENT DOCUMENTS

GB  0975862 B1 *  1/2003

* cited by examiner

*Primary Examiner* — Thuyhang N Nguyen
(74) *Attorney, Agent, or Firm* — SNELL & WILMER L.L.P.

(57) ABSTRACT

An intercooler for a gas turbine engine can include a shell having a partial annular shape, the shell defining a duct comprising an inlet and an outlet, the shell defining a first flow path between the inlet and the outlet; a supply manifold disposed proximate the outlet of the duct and extending circumferentially around the shell; and an outlet manifold disposed proximate the inlet of the duct and extending circumferentially around the shell, the supply manifold in fluid communication with the outlet manifold through a heat transfer region in the duct.

18 Claims, 7 Drawing Sheets

ENGINE WITH INTERCOOLER

FIELD

The present disclosure generally relates to engines with intercoolers, and more particularly to intercooler systems.

BACKGROUND

An engine for an aircraft typically includes a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor section and other engine loads. Engines may include various cooling systems that employ heat exchangers.

SUMMARY

An intercooler for a gas turbine engine is disposed herein. In various embodiments, the intercooler comprises: a shell having a partial annular shape, the shell defining a heat exchanger comprising an inlet and an outlet, the shell defining a first flow path between the inlet and the outlet; a supply manifold disposed proximate the outlet of the heat exchanger and extending circumferentially around the shell; and an outlet manifold disposed proximate the inlet of the heat exchanger and extending circumferentially around the shell, the supply manifold in fluid communication with the outlet manifold through a heat transfer region in the heat exchanger.

In various embodiments, the intercooler further comprises an inlet duct configured to extend from a low-pressure compressor outlet of a low-pressure compressor to the inlet of the heat exchanger. The intercooler can further comprise an outlet duct configured to extend from the outlet of the heat exchanger to a high-pressure compressor inlet of a high-pressure compressor. The outlet duct can be configured to turn a fluid exiting the outlet of the heat exchanger approximately 180 degrees.

In various embodiments, the intercooler is configured to be disposed radially outward from a core of the gas turbine engine.

In various embodiments, the supply manifold connects to the first flow path of the heat exchanger, which interacts with a second flow path defined by the heat exchanger, the second flow path including a cross-flow arrangement.

In various embodiments, the supply manifold connects to the first flow path of the heat exchanger, which interacts with a second flow path defined by the heat exchanger, the first flow path including a counter-flow arrangement A gas turbine engine is disclosed herein. In various embodiments, the gas turbine engine comprises: a low-pressure compressor and a low-pressure turbine interconnected by a first shaft to constitute the low spool, the first shaft defining a central longitudinal axis; a core defining a core longitudinal axis; a heat exchanger disposed at least partially around the core; an inlet duct extending from an outlet of the low-pressure compressor to a duct defined by the heat exchanger; and an outlet duct extending from an outlet of the heat exchanger to an inlet of the core.

In various embodiments, a supply manifold of the heat exchanger is disposed radially outward from an outlet manifold of the heat exchanger relative to the central longitudinal axis. In various embodiments, the supply manifold is spaced apart axially from the outlet manifold relative to the core longitudinal axis.

In various embodiments, the gas turbine engine further comprises a fuel tank and a combustor, the fuel tank in fluid communication with the combustor through the heat exchanger. In various embodiments, fuel from the fuel tank is configured to cool air from traveling through the heat exchanger, and wherein the air from the heat exchanger is configured to heat the fuel from the fuel tank.

In various embodiments, the heat exchanger comprises a partial annular shape around the core.

In various embodiments, the core longitudinal axis is substantially perpendicular to the central longitudinal axis.

In various embodiments, the gas turbine engine further comprises a second outlet duct extending from an outlet of the core to the low-pressure turbine.

A propulsion system configured to be embedded in a fuselage of an aircraft is disclosed herein. In various embodiments, the propulsion system comprises: a first gas turbine engine disposed adjacent to a second gas turbine engine, the first gas turbine engine and the second gas turbine engine each comprising: a low-pressure compressor and a low-pressure turbine interconnected by a first shaft to constitute the low spool, the first shaft defining a central longitudinal axis; a core defining a core longitudinal axis, the core longitudinal axis being non-concentric with the central longitudinal axis; and an intercooler disposed at least partially around the core, the intercooler defining a flow path between an outlet of the low-pressure compressor and the core, wherein an outlet duct of the intercooler of the first gas turbine engine is disposed immediately adjacent to the outlet duct of the intercooler of the second gas turbine engine.

In various embodiments, the first gas turbine engine is spaced apart laterally from the second gas turbine engine.

In various embodiments, the first shaft of the first gas turbine engine is substantially parallel to the first shaft of the second gas turbine engine. In various embodiments, a high-speed spool of the core of the first gas turbine engine is substantially parallel to the high-speed spool of the core of the second gas turbine engine.

In various embodiments, the intercooler comprises a supply manifold disposed distal from the central longitudinal axis relative to an outlet manifold, the supply manifold configured to supply a cooling fluid through the intercooler to cool air traveling along the flow path of the intercooler.

In various embodiments, the aircraft comprises the fuselage with the propulsion system disposed at least partially therein.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of a gas turbine engine. Similarly, as used herein, "forward" refers to the direction associated with the nose (e.g., a front end) of an aircraft, or generally, opposite the aft direction.

A first component that is "radially outward" of a second component means that the first component is positioned at a greater distance away from a central longitudinal axis of the gas turbine engine. A first component that is "radially inward" of a second component means that the first component is positioned closer to the engine central longitudinal axis than the second component. The terminology "radially outward" and "radially inward" may also be used relative to reference axes other than the engine central longitudinal axis.

An intercooling heat exchanger may be used in a gas turbine engine to cool the air in the flow path part way through its compression cycle, typically at the exit of the low compressor. This is done to reduce the heat while maintaining the pressure output. In order to be effective, this intercooler may be considerably large and difficult to package. The cooling provided by an intercooler can allow for a reduced core size with improved efficiency. The limiting factor for core size then becomes the low-speed shaft, which in a traditional turbine engine design needs to pass through the center of the core. A small core will not provide enough space along its axis to accommodate a shaft large enough to meet speed requirements.

Disclosed herein is an engine configuration in which an engine core is offset from the low spool and is oriented in a non-concentric (e.g., parallel, at an angle, or the like) to the engine axis. With the engine oriented as disclosed herein, the air exits a low-pressure compressor and is routed upward through the intercooler, then down through the core, where it is then routed into the low-pressure turbine. This arrangement decouples the core from the low-speed spool so that the shaft diameter is not restricted, and bearings can be added to support the low-speed shaft.

In various embodiments, the engine configuration uses a four pass, cross flow, heat exchanger. However, the present disclosure is not limited in this regard, and the figures presented herein are meant to be exemplary and not limiting.

The challenge addressed in this engine configuration is that the intercooler utilizes a large frontal area to achieve a desired cooling, which would be difficult to package if it were a standard block heat exchanger. This challenge is overcome by wrapping the heat exchanger around the engine core, as disclosed herein, in various embodiments. The partial wrapping can provide easy access to the engine core. Although a full wrapping could be used, the outer duct would likely have to be removed to access the engine core for maintenance or the like.

Figure 1:
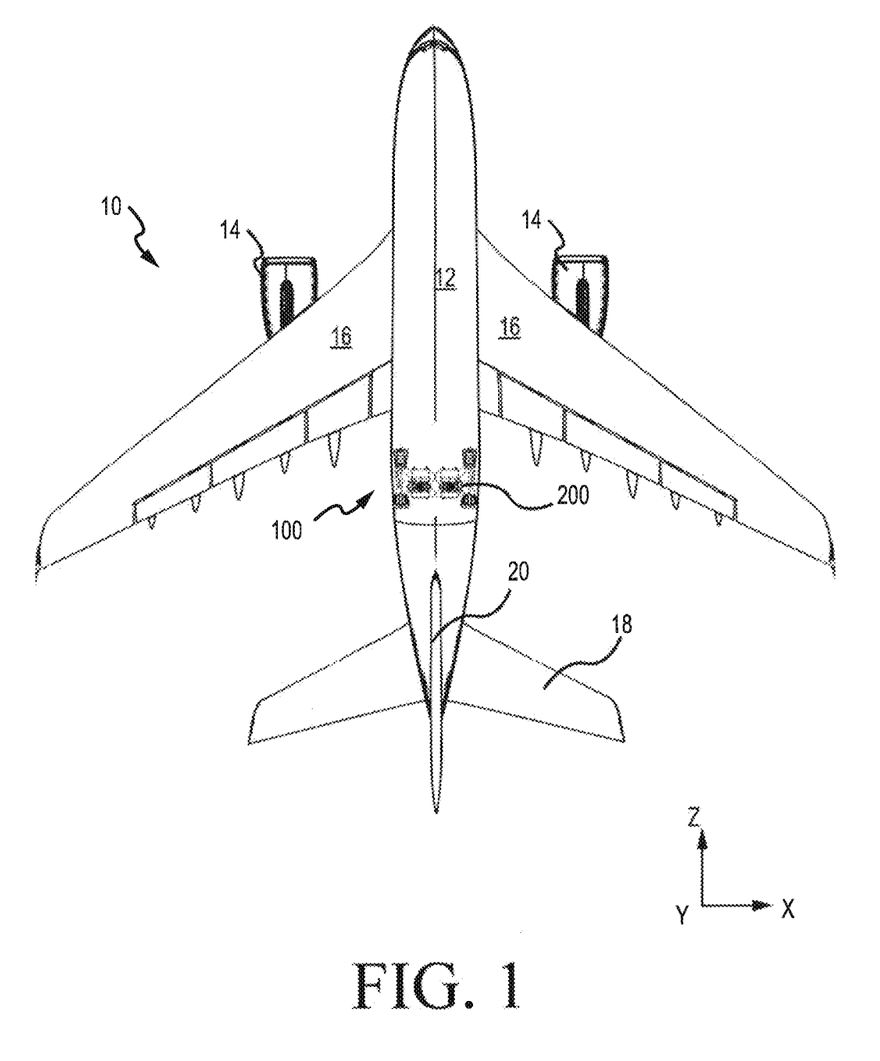
FIG. 1 illustrates a partial cross-sectional view of an aircraft with a gas turbine engine having an intercooler, in accordance with various embodiments.

Referring now to FIG. 1, a side and cross-sectional view of an aircraft 10 comprising an engine 100 including an intercooler 200 is illustrated, in accordance with various embodiments. The aircraft 10 can comprise a fuselage 12, gas turbine engines 14, wings 16, a vertical stabilizer 20, and/or horizontal stabilizers 18. In various embodiments, the aircraft 10 comprises an engine 100 with an intercooler 200 disposed at least partially in the fuselage 12. In various embodiments, the aircraft 10 comprises a plurality of the engine 100 with the intercooler 200. In various embodiments, based on a design of the engine 100 with the intercooler 200, the engine 100 can be configured to be within a fuselage 12 of an aircraft 10 (e.g., without a nacelle or the like of gas turbine engine 14). Although illustrated as including both the gas turbine engine 14 and the engine 100 with the intercooler 200, the present disclosure is not limited in this regard. For example, aircraft 10 could include, and be powered solely by the engine 100 (or a plurality of the engine 100) and be within the scope of this disclosure.

Figure 2A:
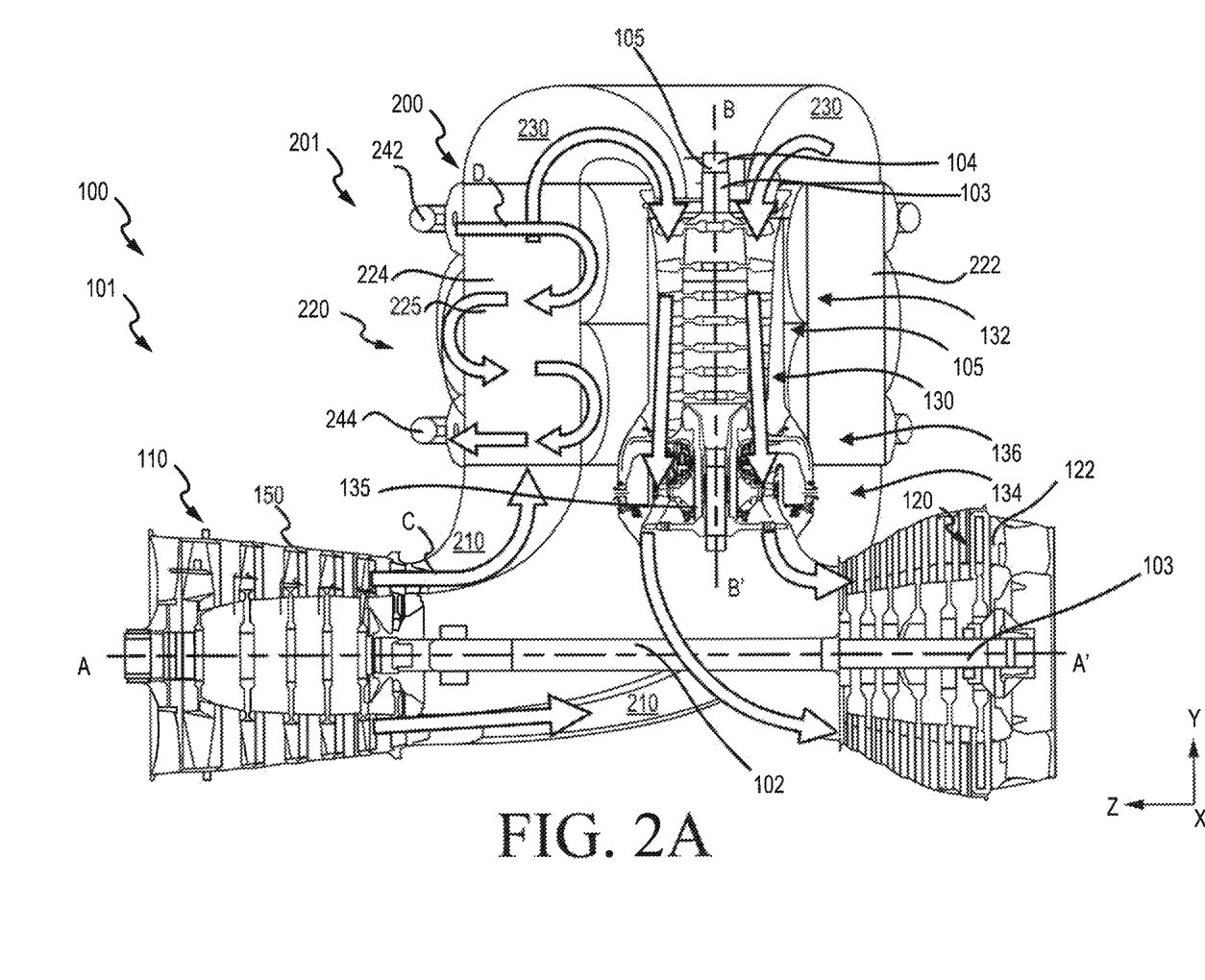
FIG. 2A illustrates a cross-sectional view of a gas turbine engine with an intercooler, in accordance with various embodiments.
Figure 2B:
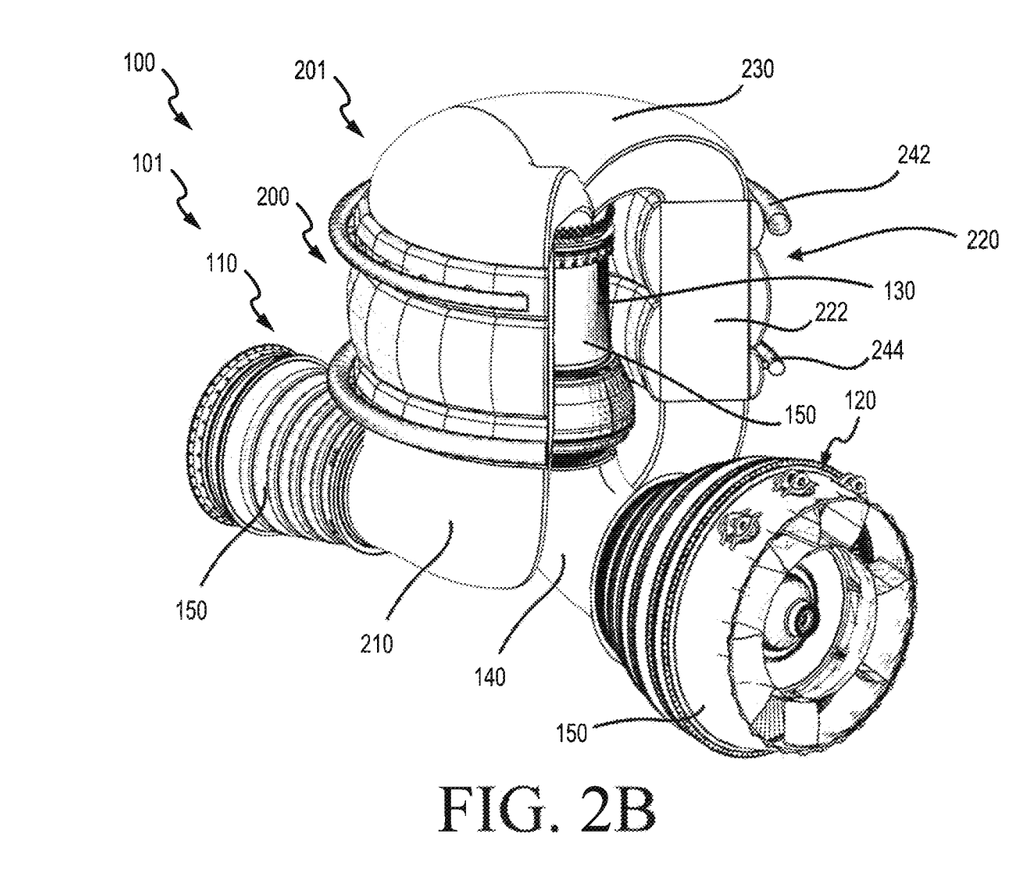
FIG. 2B illustrates a perspective view of a gas turbine engine with an intercooler, in accordance with various embodiments.

Referring now to FIGS. 2A and 2B, a cross-sectional view of the engine 100 (FIG. 2A) and a perspective view of the engine 100 (FIG. 2B) from FIG. 1 are illustrated, in accordance with various embodiments. In various embodiments, the engine 100 is a gas turbine engine 101.

In various embodiments, gas turbine engine 101 comprises a low-pressure compressor 110, a low-pressure turbine 120, and a core 130. The core 130 comprises a high-pressure compressor 132 and a high-pressure turbine 134. During operation, fluid (e.g., air) is driven along a flow path C and compressed through the low-pressure compressor 110 and the high-pressure compressor 132 of the core 130, and then expanded through the high-pressure turbine 134 of the core 130 and the low-pressure turbine 120. Although gas turbine engine 101 is depicted as a turbofan gas turbine engine herein, it should be understood that the concepts described herein are not limited to use with turbofans as the teachings may be applied to other types of turbine engines. As used herein, a "high-pressure" compressor or turbine experiences a higher pressure than a corresponding "low-pressure" compressor or turbine. Similarly, as used herein, a "low-speed" spool operates at a lower speed than a corresponding "high-speed" spool.

Gas turbine engine 101 comprise a low-speed spool 102 and the core 130. In various embodiments, the core 130 comprises a high-speed spool 104 and/or an intermediate spool 103. In this regard, the core 130 can be a dual spool or single spool core. The present disclosure is not limited in this regard. Typically, dual spool gas turbine engines include a low-speed spool mounted concentrically with a high-speed spool (e.g., with a low-speed spool disposed within the high-speed spool). In this regard, a sizing of the high-speed spool can be dependent on a sizing of the low-speed spool and vice versa. By de-coupling design considerations for the low-speed spool and the high-speed spool, a more compact, and more efficient, gas turbine engine 101 can be created as shown in FIGS. 2A and 2B, in accordance with various embodiments.

In various embodiments, the low-speed spool 102 is mounted (e.g., via bearing systems), for rotation about central longitudinal axis A-A' and relative to an engine static structure 150. It should be understood that various bearing systems at various locations may be provided, including for example, to properly support the low-speed shaft 103.

In various embodiments, the shaft 105 of the core 130 is non-co-axial with the shaft 103 of the low-speed spool 102. The high-speed spool 104 is configured for rotation about a core longitudinal axis B-B' relative to the engine static structure 150. In various embodiments, the core longitudinal axis B-B' of the high-speed spool 104 can be disposed substantially perpendicular (e.g., 90 degrees+/−15 degrees) to the central longitudinal axis A-A'. In various embodiments, the core longitudinal axis B-B' and the central longitudinal axis A-A' intersect. However, the present disclosure is not limited in this regard. For example, the core-longitudinal axis B-B' and the central longitudinal axis A-A' can be offset and still be within the scope of this disclosure.

Central longitudinal axis A-A' of the core 130 is oriented in the z direction on the provided xyz axes. The z direction on the provided xyz axes refers to the axial direction. Similarly, core longitudinal axis B-B' is oriented in the y direction on the provided xyz axes (e.g., a generally radial direction relative to the central longitudinal axis A-A'). As used herein, the term "radially" refer to directions towards and away from central longitudinal axis A-A' and the z-axis or directions towards and away from core longitudinal axis B-B', respectively. As used herein, the terms "circumferential" and "circumferentially" refer to directions about central longitudinal axis A-A' and the z-axis or about core longitudinal axis B-B' respectively.

The low-speed spool 102 comprises a shaft 103 that interconnects the low-pressure compressor 110 and the low-pressure turbine. The high-speed spool 104 comprises a shaft 105 that interconnects the high-pressure compressor 132 and the high-pressure turbine 134 of the core 130. In various embodiments, a combustor 136 can be located between the high-pressure compressor 132 and the high-pressure turbine 134, radially inward from the high-pressure turbine 134, or the like. The present disclosure is not limited in this regard.

The airflow in flow-path C may be compressed by low-pressure compressor 110 and high-pressure compressor 132 of core 130, mixed and burned with fuel in combustor 136 of core 130, then expanded over high-pressure turbine 134 of core 130 and low-pressure turbine 120. Turbines 46, 54 rotationally drive the respective low speed spool 30 and high-speed spool 32 in response to the expansion. Turbines 135, 122 rotationally drive the respective low-speed spool 102 and high-speed spool 104 in response to the expansion.

In various embodiments, the engine 100 comprises the intercooler 200. In various embodiments, intercooler 200 is configured to cool a fluid (e.g., air) traveling along flow-path C between the low-pressure compressor 110 and the high-pressure compressor 132 of the core 130. In this regard, the intercooler 200 can be used in the gas turbine engine 101 to cool the air in the flow-path C part way through its compression cycle (e.g., between the low-pressure compressor 110 and the high-pressure compressor 132). The intercooler 200 is configured to reduce heat, while maintaining the pressure output. In order to be effective, it is desirable to have the intercooler 200 relatively large for the gas turbine engine 101. Accordingly, attempting to design a dual-spool gas turbine engine with concentric spools would likely be considerably large and difficult to package. However, the cooling provided by an intercooler 200 can allow for a reduced core size with improved efficiency. The limiting factor for core size (e.g., core 130) then becomes the low-speed shaft, which in a traditional turbine engine design passes through the center of the core within the high-speed spool. A small core of a traditional dual spool gas turbine engine likely would not provide enough space along its axis to accommodate a large enough shaft to meet operational speed design criteria. Accordingly, a cooling system 201 with the intercooler 200 of the gas turbine engine 101 as disclosed herein, provides a cooling configuration in which the core 130 is offset from the low-speed spool 102 and is oriented substantially perpendicular to the central longitudinal axis A-A' to de-couple the core 130 from the low-speed shaft 103, so that a diameter of the low-speed shaft is not restricted, in accordance with various embodiments.

In various embodiments, the intercooler 200 comprises an inlet duct 210, a heat exchanger 220, and an outlet duct 230. The inlet duct 210 extends from an outlet of the low-pressure compressor 110 to an inlet of the heat exchanger 220 and defines a flow path therein along flow-path C. Similarly, the outlet duct 230 extends from an outlet of the heat exchanger 220 to an inlet of the high-pressure compressor 132 of the core 130 and defines a flow path therein along flow-path C. In various embodiments, a shell 222 of the heat exchanger 220 defines a duct 225 configured to receive a fluid (e.g., air) traveling along the flow-path C from the low-pressure compressor 110. In various embodiments, a heat transfer region 224 is defined within the duct 225.

In various embodiments, the heat exchanger 220 can comprise any heat transfer arrangement for a heat exchanger. For example, the heat exchanger 220 can be configured as a plate heat exchanger, a double pipe heat exchangers (e.g., parallel flow, counter flow, or the like), a compact heat exchangers (e.g., unmixed flow, mixed flow, etc.), shell and tube heat exchangers, or the like. The present disclosure is not limited in this regard.

In the heat transfer region 224, air that is traveling along the flow-path C is being cooled by a fluid that is traveling through fluid conduits of the heat exchanger 220 (e.g., fluid conduits that extend through the duct 225 and are in fluid communication with the supply manifold 242 and the outlet manifold 244), and the fluid that is traveling through the fluid conduit so the heat exchanger 220 is being heated by the air that is traveling along the flow-path C.

Figure 3A:
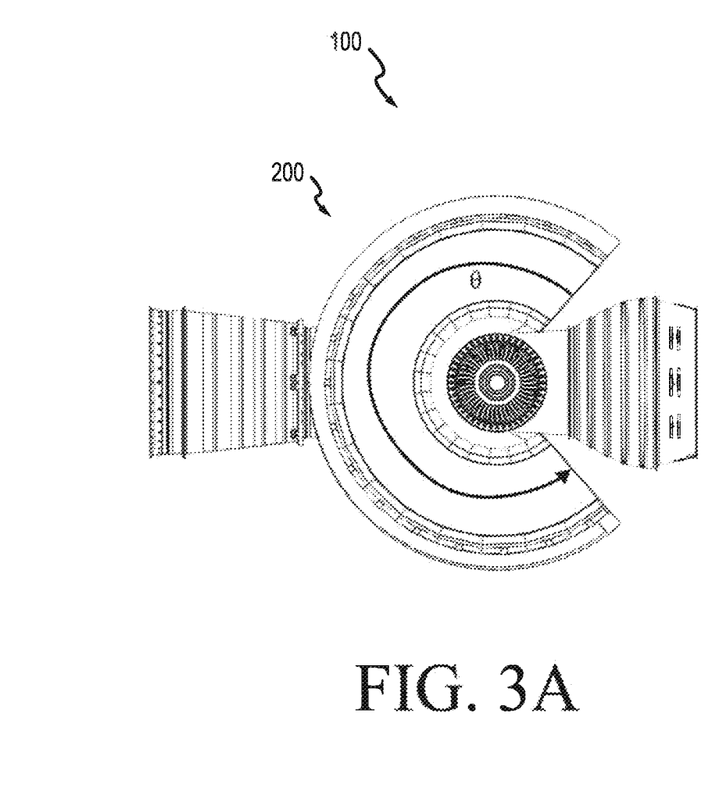
FIG. 3A illustrates a top-down view of the gas turbine engine of FIG. 2A, in accordance with various embodiments
Figure 3B:
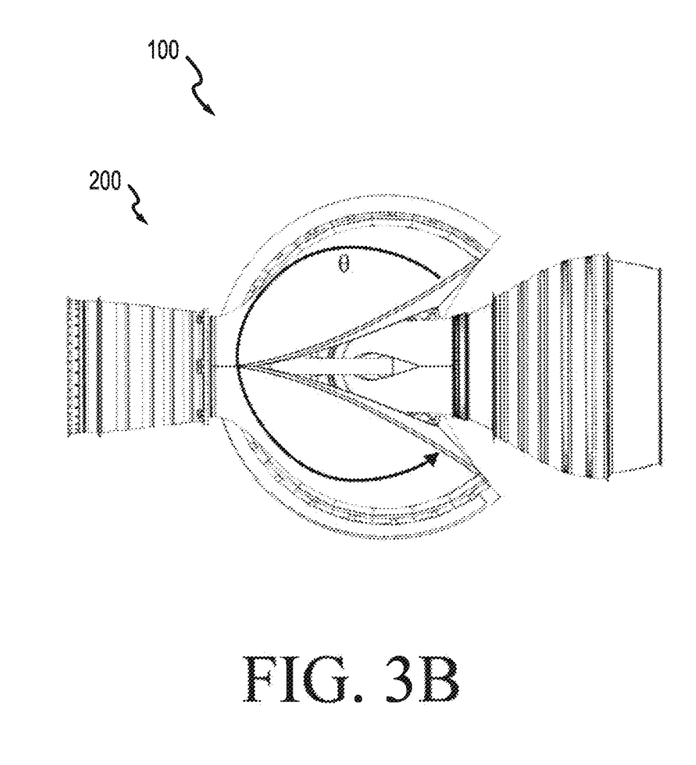
FIG. 3B illustrates a bottom-up view of the gas turbine engine of FIG. 2A.

In various embodiments, the heat exchanger 220 has a partial annular shape as shown in FIG. 2B. For example, the heat exchanger 220 is disposed radially outward from the core 130 and at least partially wrapped around the core 130. In various embodiments, the heat exchanger 220 defines an arc angle θ (e.g., as shown in FIGS. 3A and 3B). In various embodiments, the arc angle θ is greater than 90 degrees, or greater than 135 degrees, or greater than 180 degrees. In various embodiments, the arc angle is between 180 degrees and 330 degrees, or between 210 degrees and 300 degrees. The present disclosure is not limited in this regard. In various embodiments, the intercooler 200 can be annular. However, the outlet duct 230 would have to be de-coupled during servicing if access to the core 130 was desired. In various embodiments, by having a wrapped around configuration, an envelope of the intercooler 200 can be reduced relative to a typical block-type heat exchanger.

In various embodiments, by having a partial annular shape for the heat exchanger 220, the core 130 can be a line replaceable unit (LRU). Stated another way, the core 130 can be replaced, without disassembling the intercooler 200, the low-pressure compressor 110, or the low-pressure turbine 120, in accordance with various embodiments. In various embodiments, by having the partial annular shape, facilitates an ease of packaging for the gas turbine engine 101. Stated another way, the partial annular shape provides an opening (e.g., between arcuate ends of the intercooler 200) for an outlet duct 140 of the core 130 to occupy to communicate the output from the core 130 to the low-pressure turbine 120.

In various embodiments, the intercooler 200 further comprises a supply manifold 242 and an outlet manifold 244. In various embodiments, the supply manifold 242 is a distribution manifold. For example, the supply manifold 242 is configured to distribute the fluid from a single conduit to a plurality of passages within the heat exchanger 220, in accordance with various embodiments. In various embodiments, the outlet manifold 244 is a collection manifold. For example, the outlet manifold is configured to collect the fluid from the heat exchanger after exiting the heat exchanger 220 and supply the fluid to the core 130.

Figure 6:
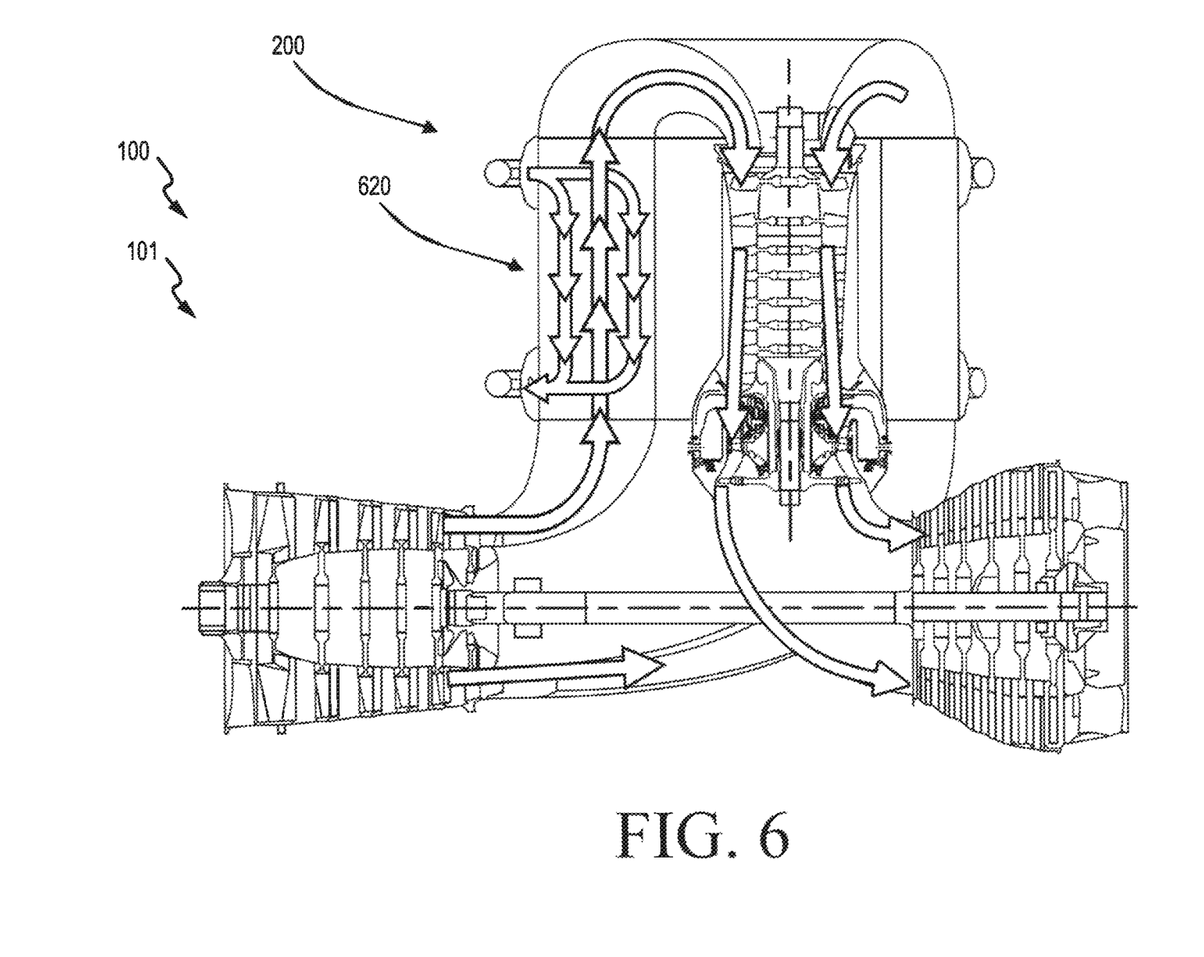
FIG. 6 illustrates a cross-sectional view of a gas turbine engine with an intercooler having a counter flow arrangement, in accordance with various embodiments.

In various embodiments, the supply manifold 242 supplies a cooling fluid (e.g., air, fuel, oil, lubricating fluid, hydraulic fluid, thermally neutral heat-transfer fluid, or any other fluid suitable for a heat exchanger) through the heat exchanger 220 and out the outlet manifold 244. The heat exchanger 220 defines cooling flow path D. In various embodiments, the cooling flow path D comprises a serpentine shape that extends radially inward, axially, radially outward, axially, radially inward, etc. In various embodiments, the flow path defined by the heat exchanger 220 is a cross-flow path to the flow path C of the partially compressed fluid from the inlet duct 210 of the intercooler. A "serpentine shape" as referred to herein a shape having a linear (or near linear portion), at least one bending portion, and a second linear (or near linear portion) that extends in an opposite direction to the first linear portion. In various embodiments, the arrangement of the flow path D directs the flow in a substantially perpendicular direction (relative to flow path C) instead of directly counter. In various embodiments, the arrangement of the flow path D provides some counter-flow effect by the multiple passes occurring in a counter direction (i.e., in an axial direction defined by longitudinal axis B-B'). In various embodiments, the flow path D can comprise a counter-flow path (e.g., as shown in heat exchanger 620 of FIG. 6). The present disclosure is not limited in this regard.

In various embodiments, by having the flow-path of the cooling fluid be in a direction counter to the flow-path C of the fluid (e.g., air) traveling through the gas turbine engine 101, the fluid in flow-path C is more efficiently cooled, relative to having a cooling flow path D that is in a same direction as the flow-path C. In various embodiments, the heat exchanger is a four-pass heat exchanger. In various embodiments a "four pass heat exchanger" refers to a heat exchanger that passes the cooling fluid in the flow path D through adjacent conduits to flow path C. Although described herein as a four-pass heat exchanger, the present disclosure is not limited in this regard. For example, a one pass heat exchanger, a two-pass heat exchanger, an eight-pass heat exchanger or the like are all within the scope of this disclosure.

In various embodiments, the supply manifold 242 extends circumferentially about the core-longitudinal axis B-B'. In various embodiments, the supply manifold 242 is spaced apart axially (i.e., along the core-longitudinal axis B-B') from the outlet manifold 244. In this regard, the outlet manifold 244 is disposed radially inward (relative to the central longitudinal axis A-A') from the supply manifold 242. In various embodiments, by having the supply manifold 242 and the outlet manifold 244 configured as such, some counter-flow effect is achieved for the intercooler 200. In this regard, a fluid traveling along flow path D will be at its coldest near the supply manifold 242 and at its warmest near the outlet manifold 244, whereas the fluid (e.g., air) traveling along the flow path C will be at its coldest near the outlet manifold 244 and at its warmest near the supply manifold 242. Accordingly, the fluid (e.g., air) traveling along the flow path C can be more efficiently cooled by having the counter-flow configuration, in accordance with various embodiments.

In various embodiments, the heat exchanger 220 further comprises a shell 222. In various embodiments, the shell 222 extends from the outlet of the inlet duct 210 to the inlet of the outlet duct 230 of the intercooler 200. In various embodiments, the heat exchanger comprises fluid conduits that extend into the shell 222 from the supply manifold 242 and travel axially along the core longitudinal axis B-B' and/or radially in a general direction towards the inlet duct 210 and out the outlet manifold 244.

Figure 4A:
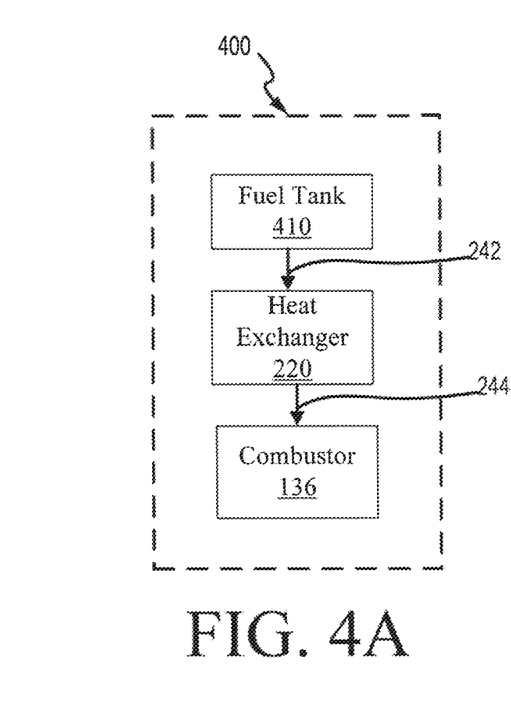
FIG. 4A illustrates an open loop cooling system for a gas turbine engine, in accordance with various embodiments.
Figure 4B:
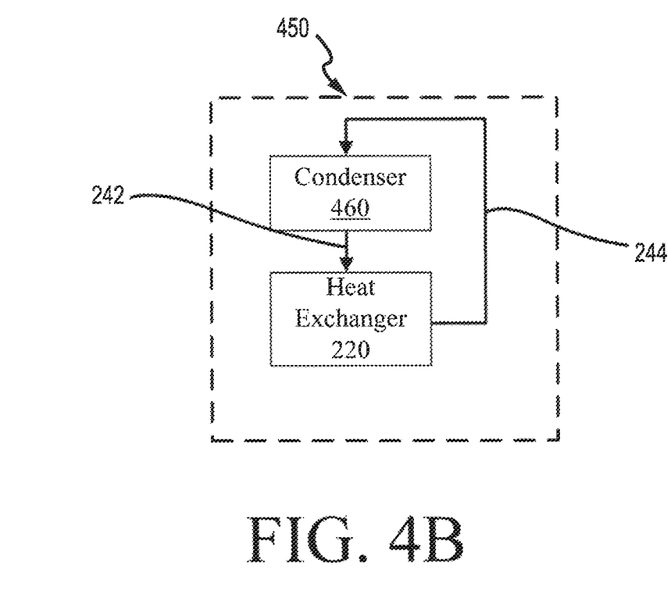
FIG. 4B illustrates a closed loop cooling system for a gas turbine engine, in accordance with various embodiments.

The cooling system 201 with the intercooler 200 can either be an open system (e.g., cooling system 400 from FIG. 4A as described further herein) or a closed system (e.g., cooling system 450 from FIG. 4B). The present disclosure is not limited in this regard.

With reference now to FIG. 4A, a schematic view of an open loop cooling system 400 is illustrated, in accordance with various embodiments. In various embodiments, in the open loop system, the cooling fluid can also be a fuel for the gas turbine engine 101. For example, the cooling system 400 can comprise a fuel tank 310 in fluid communication with the combustor 136 through the heat exchanger 220. For example, the supply manifold 242 can fluidly couple the fuel tank 410 to the heat exchanger 220, and the outlet manifold 244 can fluidly couple the heat exchanger 220 to the combustor. In various embodiments, it may be desirable to heat a fuel (e.g., hydrogen or the like) prior to combustion. In this regard, the intercooler 200 described herein may provide dual functionality for a hydrogen powered gas turbine engine (i.e., cooling a partially compressed air between a low-pressure compressor 110 and a high-pressure compressor 132 and heating a fuel from a fuel tank 410 prior to combustion in a combustor 136).

With reference now to FIG. 4B, a closed loop cooling system 450 is illustrated in accordance with various embodiments. The closed loop cooling system 450 can comprise the heat exchanger 220 and a condenser 460. In this regard, the condenser 460 can supply the cooling fluid through the supply manifold 242, and the outlet manifold 244 can act as a return conduit that returns a heated fluid that has traveled through the heat exchanger 220 to the condenser 460 to be cooled again. Accordingly, the condenser 460 re-cools fluid that travels through the heat exchanger 220, cycles the fluid back through the heat exchanger for continuous cooling of the fluid (e.g., air) traveling through the gas turbine engine 101, in accordance with various embodiments.

Figure 5:
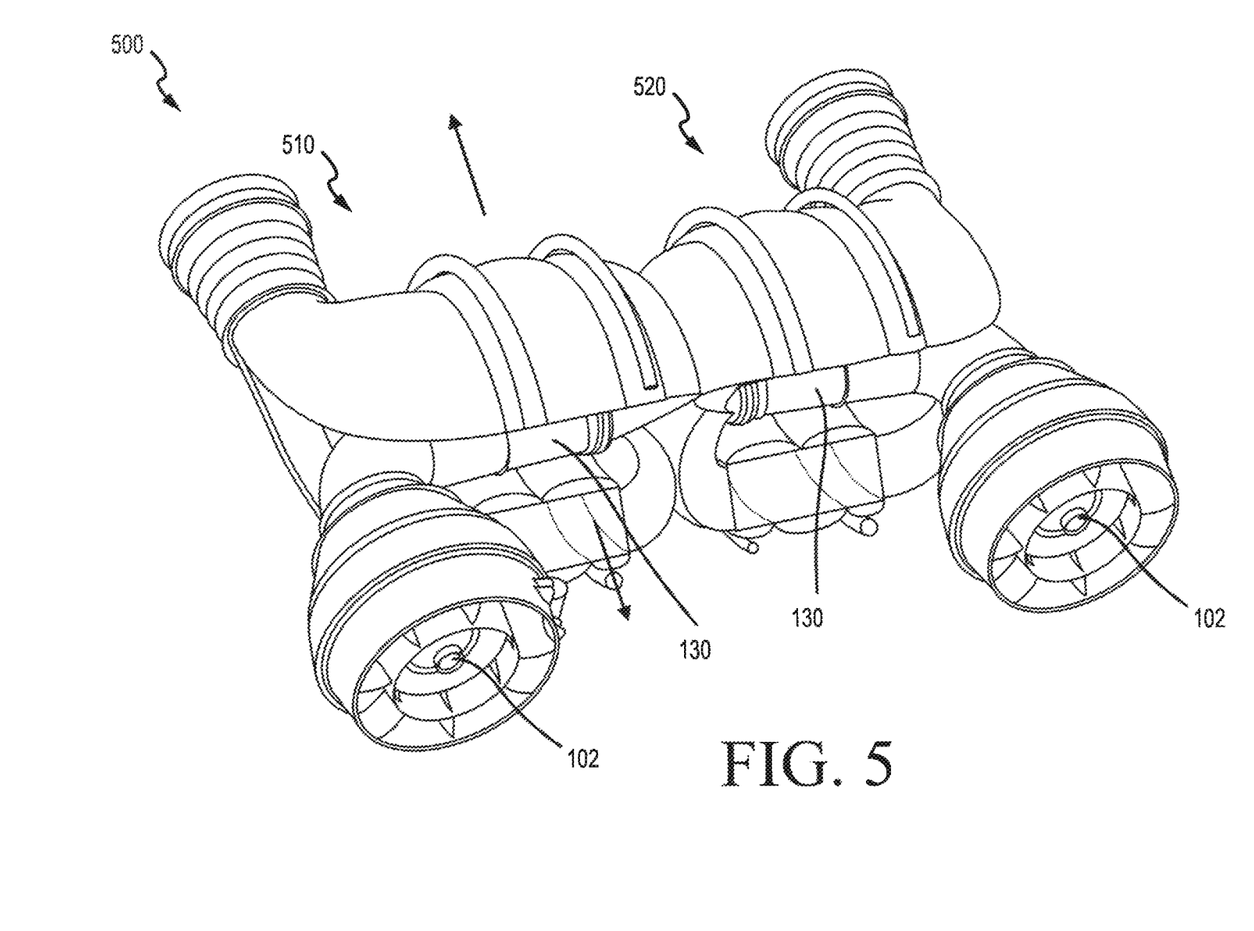
FIG. 5 illustrates a perspective view of a pair of engines with intercoolers, in accordance with various embodiments.

Referring now to FIG. 5, perspective view of a propulsion system 500 with a first engine 510 and a second engine 520 is illustrated in accordance with various embodiments. The first engine 510 and the second engine 520 can both be in accordance with the engine 100 from FIGS. 2A and 2B. In various embodiments, the first engine 510 is spaced apart substantially equally from the second engine 520 about a longitudinal centerline of an aircraft 10 from FIG. 1. In various embodiments, by having the core 130 of the engines 510, 520 offset from the low-speed spool 102 of the engines 510, 520, the engines 510, 520 are configured for being embedded in an aircraft (e.g., as shown in FIG. 1). For example, current aviation regulations prohibit engines that are aligned in parallel from being in close proximity to each other due to a burst disk from one engine core having a potential to damage the adjacent engine core because a burst disk scenario results in a radial expulsion of the disks from a core longitudinal axis. Accordingly, the offset configuration of the core 130 relative to the low-speed spool 102 facilitates an engine configuration of a propulsion system 500 where engines 510, 520 can be disposed adjacent to one another within a fuselage 12 of an aircraft 10 from FIG. 1 because a burst disk of one core (e.g., first engine 510) would not damage the second engine 520, in accordance with various embodiments. In various embodiments, the propulsion system 500 allows both low-speed spools 102 to be parallel, but the low-speed disk burst can potentially be contained or deflected as the debris would have considerably less momentum.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. An intercooler for a gas turbine engine, the intercooler comprising:
a shell having a partial annular shape, the shell defining a heat exchanger comprising an inlet and an outlet, the shell comprising a radially inner wall spaced apart from a radially outer wall, the shell defining a first flow path axially between the inlet and the outlet and radially between the radially inner wall and the radially outer wall, the partial annular shape of the shell defining an arc angle that is between 180 degrees and 330 degrees, the partial annular shape configured to be disposed radially outward from a high-speed spool of a core of the gas turbine engine, the partial annular shape configured to be at least partially wrapped around the core;
a supply manifold disposed proximate the outlet of the heat exchanger and extending circumferentially around the shell; and
an outlet manifold disposed proximate the inlet of the heat exchanger and extending circumferentially around the shell, the supply manifold in fluid communication with the outlet manifold through a heat transfer region in the heat exchanger.

2. The intercooler of claim 1, further comprising an inlet duct and an outlet duct, the inlet duct configured to extend from a low-pressure compressor outlet of a low-pressure compressor to the inlet of the heat exchanger, the outlet duct configured to extend from the outlet of the heat exchanger to a core inlet of an engine core.

3. The intercooler of claim 2, wherein the outlet duct is configured to turn fluid exiting the outlet of the heat exchanger 180 degrees.

4. The intercooler of claim 1, wherein the supply manifold connects to the first flow path of the heat exchanger, which interacts with a second flow path defined by the heat exchanger, the first flow path including a cross-flow arrangement.

5. The intercooler of claim 1, wherein the supply manifold connects to the first flow path of the heat exchanger, which interacts with a second flow path defined by the heat exchanger, the first flow path including a counter-flow arrangement.

6. A gas turbine engine, comprising:
a low-pressure compressor and a low-pressure turbine interconnected by a first shaft to constitute a low-speed spool, the first shaft defining a central longitudinal axis;
a core defining a core longitudinal axis, the core comprising a high-pressure compressor and a high-pressure turbine interconnected by a second shaft to constitute a high-speed spool;
a heat exchanger disposed at least partially around the core, the heat exchanger disposed radially outward from the core longitudinal axis;
an inlet duct extending from an outlet of the low-pressure compressor to a duct defined by the heat exchanger; and
an outlet duct extending from an outlet of the heat exchanger to an inlet of the core,
wherein the core longitudinal axis is substantially perpendicular to the central longitudinal axis.

7. The gas turbine engine of claim 6, wherein a supply manifold of the heat exchanger is disposed radially outward from an outlet manifold of the heat exchanger relative to the central longitudinal axis.

8. The gas turbine engine of claim 7, wherein the supply manifold is spaced apart axially from the outlet manifold relative to the core longitudinal axis.

9. The gas turbine engine of claim 6, further comprising a fuel tank and a combustor, the fuel tank in fluid communication with the combustor through the heat exchanger.

10. The gas turbine engine of claim 9, wherein fuel from the fuel tank is configured to cool air from traveling through the heat exchanger, and wherein the air from the heat exchanger is configured to heat the fuel from the fuel tank.

11. The gas turbine engine of claim 6, wherein the heat exchanger comprises a partial annular shape around the core.

12. The gas turbine engine of claim 6, further comprising a second outlet duct extending from an outlet of the core to the low-pressure turbine.

13. A propulsion system configured to be embedded in a fuselage of an aircraft, the propulsion system comprising:
a first gas turbine engine disposed adjacent to a second gas turbine engine, the first gas turbine engine and the second gas turbine engine each comprising:
a low-pressure compressor and a low-pressure turbine interconnected by a first shaft to constitute a low-speed spool, the first shaft defining a central longitudinal axis;
a core defining a core longitudinal axis, the core longitudinal axis being non-concentric with the central longitudinal axis; and
an intercooler disposed at least partially around the core, the intercooler defining a flow path between an outlet of the low-pressure compressor and an inlet of the core, wherein an outlet duct of the intercooler of the first gas turbine engine is disposed immediately adjacent to the outlet duct of the intercooler of the second gas turbine engine.

14. The propulsion system of claim 13, wherein the first gas turbine engine is spaced apart laterally from the second gas turbine engine.

15. The propulsion system of claim 13, wherein the first shaft of the first gas turbine engine is substantially parallel to the first shaft of the second gas turbine engine.

16. The propulsion system of claim 15, wherein a high-speed spool of the core of the first gas turbine engine is substantially parallel to the high-speed spool of the core of the second gas turbine engine.

17. The propulsion system of claim 13, wherein the intercooler comprises a supply manifold that is disposed distal from the central longitudinal axis relative to an outlet manifold, the supply manifold configured to supply a cooling fluid through the intercooler to cool air traveling along the flow path of the intercooler.

18. The aircraft comprising the fuselage with the propulsion system of claim 13 disposed at least partially therein.

* * * * *